Aug. 25, 1936. H. N. DURHAM Re. 20,082
MECHANISM FOR SEPARATING INTERMIXED DIVIDED MATERIALS
Original Filed Aug. 5, 1931.
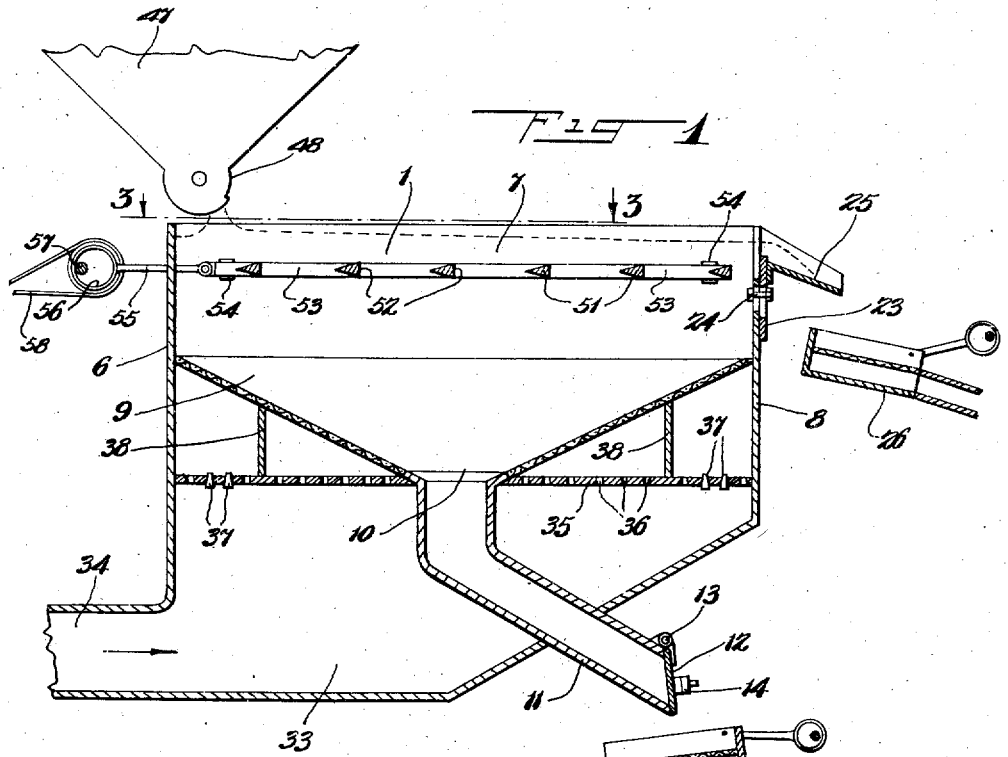
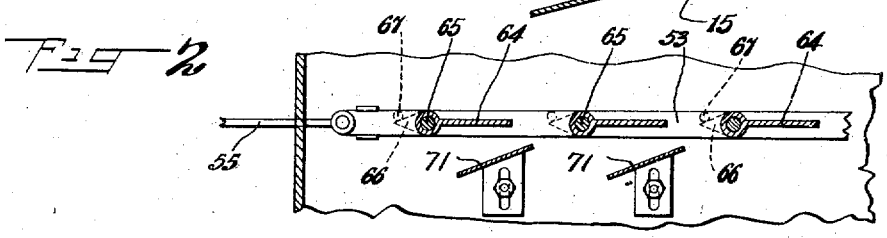
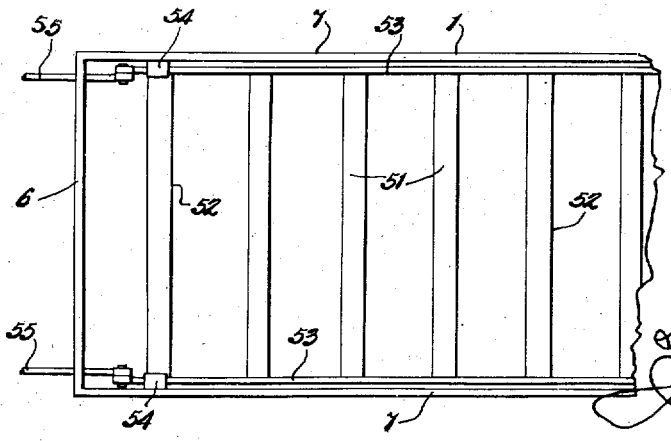
INVENTOR
H. N. Durham
BY
John D. Morgan
ATTORNEY Reissued Aug. 25, 1936

Re. 20,082

UNITED STATES PATENT OFFICE 20,082

MECHANISM FOR SEPARATING INTERMIXED DIVIDED MATERIALS

Hobart N. Durham, Munsey Park, N. Y., assignor to Richard Peale, Clearfield, Pa., W. Sanders Davies, New York, N. Y., and William B. Oakes, Rutherford, N. J., trustees Original No. 1,961,743, dated June 5, 1934, Serial No. 555,161, August 5, 1931. Application for reissue June 5, 1935, Serial No. 25,089

12 Claims. (Cl. 209—474)

The invention relates to a novel and useful mechanism for separating intermixed, divided materials, and more particularly to a useful and novel process and mechanism having special applicability for purifying run-of-the-mine coal.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:—

Fig. 1 is a longitudinal, vertical section through a mechanism embodying the invention;

Fig. 2 is a partial vertical, longitudinal section of a modification, and corresponds to the central part of Fig. 1; and Fig. 3 is a fragmentary top plan, corresponding to Fig. 1.

The invention relates to a novel and improved mechanism especially capacitated for separating intermixed broken, or other finely divided, materials varying widely in range of sizes of the pieces or particles, and some at least of the intermixed materials varying but little in their specific gravities. An intermixture of this kind to which the invention is particularly applicable, is raw or impure coal as it comes from the mine, with only the very large lumps or pieces crushed or removed. That is, effective and satisfactory commercial purification of such coal is effected without the costly and cumbersome presizing which is widely practiced, and which has been necessary in the greater part of the prior art processes and mechanisms.

Due to the concurrent wide size range of the pieces, and the close approximation in specific gravities of the intermixed materials, successful and efficient commercial separation, such as purification of run-of-mine coal above-referred to, present a problem of great practical difficulty, especially in view of the commercial requirements for an exceedingly close approximation to the washability curves, or float-and-sink tests.

The invention employs as the separating agency or medium a dry, particulate fluid or fluid agency, of variably predeterminable specific gravity. I employ as the present preferred form, a dry, finely-divided or otherwise particulate material through which air, or other gas, is infiltrated to render it thoroughly fluid, and in such regulated proportion as to secure a specific gravity which will establish and maintain the desired splitting point for the particular coal being purified.

The most efficient dry fluid medium, so far as now known, consists of finely particulate material, such as sand or very fine coal, into which a regulated quantity of air is infiltrated to impart practically complete fluid properties to the infiltrated material, and at the same time to give a specific gravity to the dry fluid medium between that of the lightest material of one separated group and that of the heaviest material of the other separated group, or a specific gravity which in cooperation with currents or flowage movement likewise created in the fluid medium will effect a separation of the intermixed materials at the required or desired splitting point.

By my invention there is maintained as the coal purifying instrumentality, a body of particulate fluidic medium, comprising preferably sand or fine coal, rendered more completely fluidic and of a proper specific gravity by regulated infiltration of air, so as to constitute a sink and float medium for the coal being purified; and cooperating with the foregoing, a current is mechanically created and maintained within the upper part of the body of fluidic medium, which further acts dynamically and agitationally upon the coal to impart a forward propulsive effect and to facilitate and increase the separating action. The refuse, which is of heavier specific gravity than the fluidic medium will sink downwardly therethrough, and the lighter coal will float upon or within the fluidic medium, and will also be impelled to the discharge locus by the current action, and separation and purification is thereby effected. The current flow, created directly in the upper part of the fluidic medium, and moving from the feed locus to the discharge locus of the coal, acts indirectly on the coal through the agency of the fluidic medium. This current action of the fluidic medium impels forwardly the bed of coal undergoing separation and purification without in any wise disturbing or impairing the coaction of the coal and fluidic medium in the separating or purifying operation. In addition to effecting the relatively rapid progression of the coal without impairment of the separating action, the current flow also provides as an element or component of the separating and purifying process the dynamic or stream effect of the fluid medium, and as an additional purifying factor, an agitational and loosening action of the fluidic medium on the coal.

More particularly, by my invention, there is maintained a body of fluidic material having the characteristics described and acting as a sink and float fluidic medium, in the process of purifying the bed of coal. Mechanical means are provided, acting directly in the upper part of the body of fluidic medium, to create and maintain a current of the fluidic medium moving from the feeding-on locus to the discharge locus of the bed of coal, with regulable speed control for said mechanical means to correspondingly control the current action. By the mechanical creation and regulation of the current flow within the fluidic medium, a corresponding nice and comprehensive control is effected of the positive forward progression of the bed of coal; of the concurrent dynamic, stream-like separation action; and also of the fluidic agitation, acting directly on the bed of coal, which promotes and accelerates the separating action. The relatively quiescent inferior body of the fluidic medium acts as a support to the surface current and agitation as well as a sink and float medium or agency.

It will be understood that the foregoing general description of the invention, and the following detailed description as well, are illustrative and exemplary, but are not restrictive of the invention.

Referring now in detail to the embodiment of the invention illustrated by way of example in the accompanying drawing, a table 1 is provided for the bed of fluidic medium, the table comprising a rear wall 6, side walls 7 and a front wall 8. The bottom 9 of the table is of air-pervious material, which is connected at its upper edges to the side and end walls of the table, and is inclined downwardly and inwardly therefrom to a central refuse discharge orifice 10. The orifice 10 communicates with a downwardly-inclined refuse discharge chute 11, which passes through and projects outwardly from the bottom of the air chamber. The refuse discharge chute is preferably provided with discharge regulating gate 12, pivotally supported at 13, and having a counterweight 14. The refuse is discharged onto a vibrating screen 15, where it is desanded, the refuse being conveyed away and the sand being recirculated. For the purpose of regulating the depth of the surface current, and the head imposed on the fluidic medium, the front or discharge top edge of the table is regulable in height by suitable means, and as shown a front board 23 is mounted on the front wall 8 by means of vertically disposed bolt and slot connections 24. A discharge chute 25 is also provided which discharges the purified coal onto a vibrating screen 26, where the sand is removed, and then recirculated. A vertically adjustable skimmer may be provided within the bed, if desired, for effecting a split between the bottom of the current of purified coal and the sand.

Means are provided for infiltrating air into the particulate fluid material, and means are capacitated to provide local regulation of the air infiltration in the different parts of the fluidic body. As embodied, an air chamber 33 is provided beneath the table, to which the air is supplied through a conduit 34 from a fan, or other suitable source of supply, and from which chamber the air supplied for the fluidic medium may be nicely regulated as required. Just beneath the air-pervious bottom 9 of the table is a floor 35, provided with a relatively large number of air-passing apertures 36, which may be optionally left open or closed by suitable means such as corks 37. Above the floor 35, and extending from it to the air-pervious bottom 9, are a plurality of vertically-disposed partitions 38, which divide the intervening space into any desired number of chambers, within which the passage of the air, and the air action upon the bed of particulate fluidic material, may be independently regulated as desired by means of the number of corks 37 used in the various chambers.

Means are provided for proportionally feeding the raw coal to the surface of the fluidic medium, and as embodied a hopper 47 for the raw coal is provided, having a variable speed feeding device 48, which may be of any standard or other suitable form, whereby the raw coal is accurately fed at a predetermined rate to the bed of fluidic material, and the rate of feed may be regulated to the point of greatest efficiency for the particular kind of coal and the conditions of separation.

Means are provided by the invention, operating within the upper part of the bed of fluid materials for creating and maintaining a positive current of the fluidic material from the feeding-on locus of the coal to the place of discharge. As embodied in Fig. 1, a plurality of wedge-shaped plates 51 are arranged cross-wise of the bed of fluidic material, and in a horizontal series extending lengthwise of the bed, the blades being located within and a short distance beneath the surface of the fluidic medium. The depth of the plates beneath the surface of the medium may be regulated as desired or found to be most efficient. The sharp edges of the plates 51 are at the rear, and they have flat vertical faces 52 along the front side thereof. Thus as the series of plates are rapidly reciprocated they positively impel the fluidic medium forwardly when moving in that direction, but due to their sharp rear edges, the plates cut backwardly through the fluidic medium on their return stroke without causing appreciable motion of the medium.

Suitable means are provided for reciprocating the current creating plates 51, and as embodied, they are mounted in side frames 53, which are reciprocable horizontally in guides 54, mounted on the side wall 7 on the table. In the embodied form of actuating means, eccentric rods 55 are shown pivotally connected to the rear end of the frames 53, and the eccentrics 56 are mounted on a shaft 57. The shaft 57 is provided with any suitable form of variable speed drive 58. By varying the speed of the drive, the speed of the plates 51 may be correspondingly regulated to create the current effect desired. The sand, or other particular material, screened out from the refuse and from the coal may be recirculated, and sufficient sand may be fed in with the raw coal to make good any losses.

In Fig. 2 a different form of current creating device is shown, comprising a series of angularly movable blades 64, mounted on shafts 65, mounted in and extending across between the reciprocable side plates 53. These blades are designed to move to a substantially vertical position during the forward movement of the frame 53 to impel the fluidic medium forwardly in a current, the blades moving to a substantially horizontal position on the reverse stroke, so as to cut backwardly inactively through the fluid medium, and to disturb the current flow as little as possible. To impart the desired angular motion to the blades 64, there is provided on the shaft 65, at one side, downwardly projecting tails or trips 66, which at the rear end of the stroke of the frame 53 engage pins 67 projecting inwardly from the side walls 7 of the table, to raise the plates 64 to vertical position preparatory for the forward current creating stroke. The action of the fluidic medium will swing the plates 64 to the horizontal position for the return movement.

With either of these current creating devices there may be used, if desired, current directing plates 71, which may be disposed at any position and inclination in the fluidic medium beneath the frames 53, by any suitable means, such as bolt and slot connections, to direct the pressure and flow of fluidic medium upwardly and forwardly as may be desired. The pressure of the underlying body of fluidic medium, and the upwardly rising or boiling action of the infiltrated air will however create substantially the same effect, and in many cases to a sufficient degree, without the use of the plates.

By my invention there is secured the full and highly efficient sink and float separating action of a deep bed of the particulate fluidic medium, and at the same time the mechanical propulsive effect required to progress the coal over the fluidic body as rapidly as possible consistent with the highest efficient purifying capacity of the table. At the same time, all disturbance of the relation of the coal and fluidic medium is avoided. There is no dragging of the coal across the surface of the fluidic medium, nor any other disturbance of the relation indicated. On the other hand, the forward impulsion of the coal by the flow of the fluidic medium in which it is immersed, and by which it is floated, effects the required forward progression of the coal from the feeding locus to the discharge locus and at the same time gains a higher degree of separating and purifying efficiency through the dynamic and agitational action of the flowing fluidic medium on the coal immersed therein and sustained thereby.

The invention as exemplarily disclosed is applied only to a primary table, but it may be applied in like manner to a retreatment system involving any number of tables.

The invention in its broader aspects is not limited to the specific mechanisms shown and described but departures may be made therefrom within the scope of the accompanying claims without departing from the principles of the invention and without sacrificing its chief advantages.

What I claim is:

1. A mechanism for purifying coal including in combination means for maintaining a quiescent body of a dry, particulate gas-distended fluidic medium, means for feeding raw coal to the surface of said medium, means acting within the medium for creating a shallow current flowing across the top of the body to propel the coal thereacross, and means for collecting refuse which has settled below the surface current and into the quiscent body.

2. A mechanism for purifying coal including in combination means for maintaining a quiescent body of a dry, particulate gas-distended fluidic medium, means for feeding raw coal to the surface of said medium, means comprising a reciprocatory impelling device acting within the medium for creating a current flowing across the top of the body to propel the coal thereacross, and means for collecting refuse which has settled below the surface current and into the quiscent body.

3. A mechanism for purifying coal including in combination means for maintaining a quiscent body of a dry, particulate gas-distended fluidic medium, means for feeding raw coal to the surface of said medium, means comprising a reciprocatory impelling device operable in one direction only and acting within the medium for creating a current flowing across the top of the body to propel the coal thereacross, and means for collecting refuse which has settled below the surface current and into the quiscent body.

4. A mechanism for purifying coal including in combination means for maintaining a quiscent body of a dry, particulate gas-distended fluidic medium, means for feeding raw coal to the surface of said medium, means comprising spaced-apart mechanical impelling means acting within the medium for creating a shallow current flowing across the top of the body to propel the coal thereacross, and means for collecting refuse which has settled below the surface current and into the quiscent body.

5. In a mechanism for purifying coal in combination a stationary air-pervious table for maintaining a bed of dry, gas-distended fluidic material of substantial depth, means for feeding impure coal to the surface of said bed to undergo stratification and separation within said fluidized bed, and means for effecting an agitational and loosening action on the bed comprising a relatively shallow member movable back and forth in a shallow layer below the surface of the bed.

6. In a mechanism for purifying coal in combination a stationary air-pervious table for maintaining a bed of dry-gas-distended fluidic material of substantial depth, means for feeding impure coal to the surface of said bed to undergo stratification and separation within said fluidized bed, and means for effecting an agitational and loosening action on the bed comprising a relatively shallow member reciprocating substantially parallel to the surface of the bed and over substantially the same path in both directions.

7. In a mechanism for purifying coal in combination a stationary air-pervious table for maintaining a bed of dry, gas-distended fluidic material of substantial depth, means for feeding impure coal to the surface of said bed to undergo stratification and separation within said fluidized bed, and means for effecting an agitational and loosening action on the bed comprising an apertured air-pervious member movable back and forth in a shallow layer below the surface of the bed.

8. In a mechanism for purifying coal in combination a stationary air-pervious table for maintaining a bed of dry, gas-distended fluidic material of substantial depth, means for feeding impure coal to the surface of said bed to undergo stratification and separation within said fluidized bed, means for effecting an agitational and loosening action on the bed comprising a relatively shallow reciprocating, apertured member through which material in the bed may settle, said member being movable in a plane below the surface of the bed, means for discharging a flotant stratum of purified coal from the table above said member and means for discharging settled refuse from the table below said member.

9. In a mechanism for purifying coal in combination a stationary air-pervious table for maintaining a bed of dry, gas-distended fluidic material of substantial depth, means for feeding impure coal to the surface of said bed to undergo stratification and separation within said fluidized bed, means for effecting an agitational and loosening action on the bed comprising a relatively shallow reciprocating, apertured member through which material in the bed may settle, said member being movable in a plane below the surface of the bed, means for discharging a flotant stratum of coal from the end of the table remote from the feed end and above said reciprocating member, and means for discharging settled refuse from the same end of the table and below said member.

10. In a mechanism for purifying coal in combination a stationary air-pervious table for maintaining a bed of dry, gas-distended fluidic material of substantial depth, means for feeding impure coal to the surface of said bed to undergo stratification and separation within said fluidized bed, means for effecting an agitational and loosening action on the bed comprising a reciprocating, apertured member movable in a shallow path below and substantially parallel to the surface of the bed, means for discharging a flotant stratum of coal from the end of the table remote from the feed end and above said reciprocating member, and means for discharging settled refuse by gravity from the same end of the table and below said member.

11. In a mechanism for purifying coal in combination a relatively long and narrow, stationary air-pervious table, having a sloping bottom, for maintaining a bed of dry, gas-distended fluidic material of substantial depth, means for feeding impure coal to the surface of said bed at the rear end thereof to undergo stratification and separation within said fluidized bed, means for effecting an agitational and loosening action on the bed comprising a reciprocating, apertured, shallow member movable in a shallow layer below the surface of the bed, means for discharging a flotant stratum of coal from the end of the table remote from the feed end and above said reciprocating member, and means for discharging settled refuse from the same end of the table and below said member.

12. In a mechanism for purifying coal in combination a stationary air-pervious table for maintaining a bed of dry, gas-distended fluidic material of substantial depth, means for feeding impure coal to the surface of said bed to undergo stratification and separation within said fluidized bed, means for effecting an agitational and loosening action on the bed comprising a reciprocating, apertured, shallow member movable in a shallow layer below the surface of the bed, means for discharging a flotant stratum of coal from the table at the end remote from the feed and above said reciprocating member, means for moving settled refuse by gravity along the bottom of the table, and pressure-regulated means at the same end of the table for controlling the discharge of said refuse.

HOBART N. DURHAM.